United States Patent
Kurasawa

(10) Patent No.: US 8,304,954 B2
(45) Date of Patent: Nov. 6, 2012

(54) COMMUTATOR MOTOR UTILIZING EXISTING PART TO RESTRICT RADIALLY OUTWARD MOVEMENT OF BRUSH HOLDERS

(75) Inventor: Tadahiro Kurasawa, Chita-gun (JP)

(73) Assignee: Denso Corporation, Kariya (JP)

( * ) Notice: Subject to any disclaimer, the term of this patent is extended or adjusted under 35 U.S.C. 154(b) by 620 days.

(21) Appl. No.: 12/232,044

(22) Filed: Sep. 10, 2008

(65) Prior Publication Data
US 2009/0066185 A1    Mar. 12, 2009

(30) Foreign Application Priority Data
Sep. 11, 2007  (JP) ................................. 2007-235230

(51) Int. Cl.
  *H01R 39/38*  (2006.01)
  *H02K 13/00*  (2006.01)
(52) U.S. Cl. ........................................ 310/239; 310/242
(58) Field of Classification Search .................. 310/239, 310/242
See application file for complete search history.

(56) References Cited

U.S. PATENT DOCUMENTS

| | | | | |
|---|---|---|---|---|
| 2,537,714 A | * | 1/1951 | Spielman | 310/247 |
| 3,577,025 A | * | 5/1971 | Kingsbury | 310/239 |
| 3,784,856 A | * | 1/1974 | Preston | 310/239 |
| 5,717,271 A | * | 2/1998 | Aoki et al. | 310/242 |
| 5,864,194 A | * | 1/1999 | Okamoto et al. | 310/239 |
| 6,005,323 A | | 12/1999 | Morimoto et al. | |
| 7,256,527 B2 | * | 8/2007 | Niimi | 310/239 |
| 2004/0189120 A1 | * | 9/2004 | Takashima et al. | 310/89 |
| 2004/0201296 A1 | * | 10/2004 | Hama et al. | 310/71 |
| 2006/0170296 A1 | * | 8/2006 | Nakajima et al. | 310/89 |
| 2007/0007846 A1 | * | 1/2007 | Niimi | 310/239 |

FOREIGN PATENT DOCUMENTS

| | | |
|---|---|---|
| EP | 1184959 A1 | 3/2002 |
| JP | A-UM-H05-078165 | 10/1993 |
| JP | A-11-234968 | 8/1999 |
| JP | A-2002-78294 | 3/2002 |
| JP | B2-3486094 | 10/2003 |

OTHER PUBLICATIONS

Mar. 6, 2012 Office Action issued in JP Application No. 2007-235230 (with English translation).

* cited by examiner

*Primary Examiner* — Quyen Leung
*Assistant Examiner* — Alex W Mok
(74) *Attorney, Agent, or Firm* — Oliff & Berridge, PLC

(57) ABSTRACT

In a commutator motor, a brush holding device includes a plurality of brush holders and a substantially annular holder plate. Each of the brush holders includes a holder frame, which receives a pair of brush and spring, and a bottom plate having two opposite side portions. The holder plate is disposed around a commutator and has a major surface on which a plurality of pairs of guide walls are formed; each pair of the guide walls defines a pair of grooves. The side portions of the bottom plate of each of the brush holders are respectively fit in a corresponding pair of the grooves defined by the guide walls. Each of the brush holders has a radially outer end that abuts an inner surface of a side wall of an end frame, whereby radially outward movement of each of the brush holders is restricted by the end frame.

16 Claims, 10 Drawing Sheets

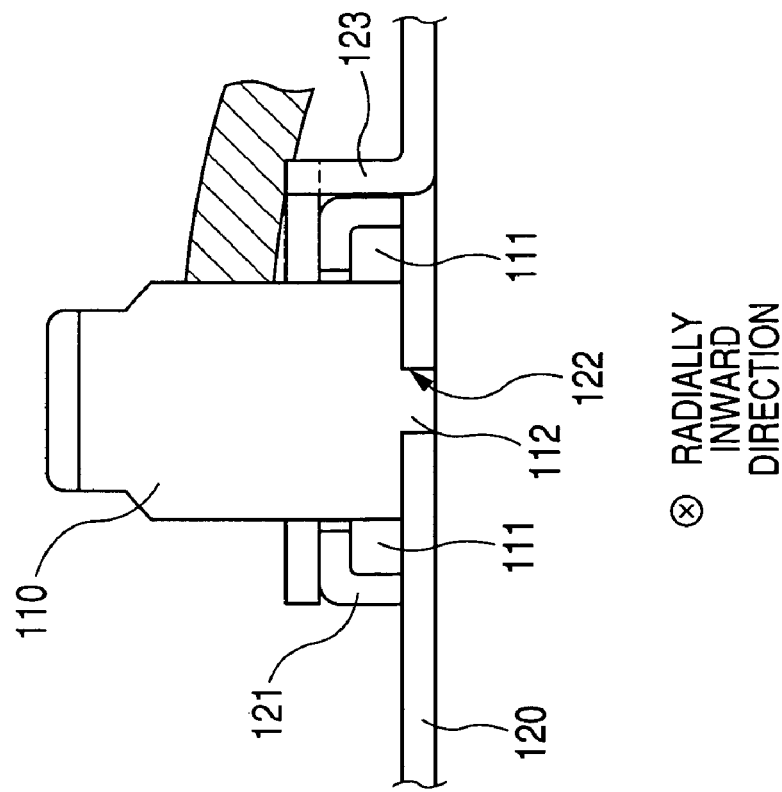
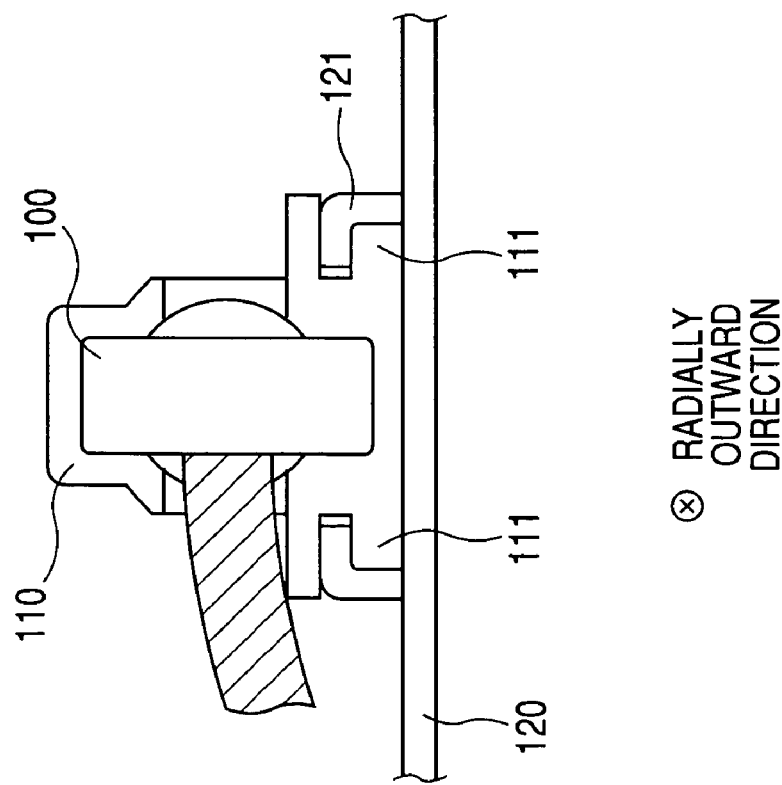

COMMUTATOR MOTOR UTILIZING EXISTING PART TO RESTRICT RADIALLY OUTWARD MOVEMENT OF BRUSH HOLDERS

CROSS-REFERENCE TO RELATED APPLICATION

This application is based on and claims priority from Japanese Patent Application No. 2007-235230, filed on Sep. 11, 2007, the content of which is hereby incorporated by reference in its entirety into this application.

BACKGROUND OF THE INVENTION

1. Technical Field of the Invention

The present invention relates generally to commutator motors. More particularly, the invention relates to a commutator motor that utilizes an existing part thereof to restrict radially outward movement of brush holders.

2. Description of the Related Art

Japanese Patent No. 3486094, an English equivalent of which is U.S. Pat. No. 6,005,323, discloses a brush holding device used in a commuter motor.

The brush holding device includes, as shown in FIGS. 10A and 10B, a brush holding frame 110 that holds therein a brush 100, and a base plate 120 on which the brush holding frame 110 is fixed.

The brush holding frame 110 has a box-like shape. The brush holding frame 110 includes a pair of flange portions 111, which respectively protrude from an opposite pair of sides of a bottom plate of the brush holding frame 110, and a protrusion 112 that protrudes downward from the bottom plate.

The base plate 120 has a substantially annular shape. The base plate includes a pair of fixing portions 121, a receiving opening 122, and a movement restricting portion 123. The fixing portions 121 are each cut and raised up from a major surface of the base plate 120 and bent into a hook shape. The receiving opening 122 is formed, by cutting out a rectangular portion of the base plate 120 from the radially outer side to the radially inner side of the base plate 120, to have a substantially "U" shape. The movement restricting portion 123 is provided to restrict the brush holding frame 110 from moving in the radially outward direction of the base plate 120 under the force of a spring (not shown) disposed in the brush holding frame 110.

In the assembly process, the brush holding frame 110 is made to slide radially inward on the major surface of the base plate 120, with the protrusion 112 of the brush holding frame 110 being fitted into the receiving opening 122 of the base plate 120, until the flange portions 111 of the brush holding frame 110 are respectively inserted and fixed in grooves defined by the fixing portions 121 in the base plate 120. Meanwhile, an end surface of the protrusion 112 of the brush holding frame 110 which faces the radial center of the base plate 120 makes contact with the bottom face of the "U"-shaped receiving opening 122 of the base plate 120, so that the radially inward movement of the brush holding frame 110 is restricted by the bottom face of the receiving opening 122. Thereafter, the movement restricting portion 123 is bent up from the major surface of the base plate 120 to make contact with part of the brush holding frame 110, thereby restricting the radially outward movement of the brush holding frame 110.

With the above configuration of the brush holding device, however, it is necessary to bend up the movement restricting portion 123 after attaching the brush holding frame 110 to the base plate 120. Consequently, the number of processes needed to produce the brush holding device is increased, thereby increasing the manufacturing cost.

Moreover, since the radially inward movement of the brush holding frame 110 is restricted by the bottom face of the receiving opening 122 of the base plate 120, it is impossible to push and thereby move the brush holding frame 110 in the radially inward direction when the brush holding device is further assembled to a yoke or an end frame of the commutator motor. Therefore, to prevent interference of the brush holding frame 110 with the yoke or end frame, it is necessary to provide a clearance between the radially outer end of the brush holding frame 110 and the radially inner surface of the yoke or end frame in design of the commutator motor. However, such a clearance will increase the radial dimension of the commutator motor, thus making it difficult to minimize the size of the commutator motor.

SUMMARY OF THE INVENTION

According to the present invention, there is provided a first commutator motor which includes: 1) a hollow cylindrical yoke having an open end; 2) an end frame that closes the open end of the yoke, the end frame having a cylindrical side wall that engages with the open end of the yoke and an end wall that covers the open end of the yoke; 3) a field arranged on an inner periphery of the yoke; 4) an armature surrounded by the field to generate torque, the armature including an armature shaft that has an end portion rotatably supported by the end frame via a bearing; 5) a commutator that is provided on the end portion of the armature shaft; 6) a plurality of brushes that slide on the outer surface of the commutator during rotation of the armature shaft; 7) a plurality of springs each of which presses a corresponding one of the brushes against the outer surface of the commutator; and 8) a brush holding device that holds the brushes along with the corresponding springs. Further, in the first commutator motor, the brush holding device includes a plurality of brush holders and a substantially annular holder plate. Each of the brush holders includes a holder frame, which receives therein a corresponding pair of one of the brushes and one of the springs, and a bottom plate that has two opposite side portions. The holder plate is disposed around the commutator and has a major surface on which a plurality of pairs of guide walls are formed at given intervals in a circumferential direction of the holder plate; each pair of the guide walls defines a pair of grooves in the holder plate. The side portions of the bottom plate of each of the brush holders are respectively fit in a corresponding pair of the grooves defined by the guide walls in the holder plate. Each of the brush holders has a radially outer end that abuts an inner surface of the side wall of the end frame, whereby radially outward movement of each of the brush holders is restricted by the end frame.

According to the present invention, there is also provided a second commutator motor which includes: 1) a hollow cylindrical yoke having an open end; 2) an end frame that closes the open end of the yoke; 3) a field arranged on an inner periphery of the yoke; 4) an armature surrounded by the field to generate torque, the armature including an armature shaft that has an end portion rotatably supported by the end frame via a bearing; 5) a commutator that is provided on the end portion of the armature shaft; 6) a plurality of brushes that slide on the outer surface of the commutator during rotation of the armature shaft; 7) a plurality of springs each of which presses a corresponding one of the brushes against the outer surface of the commutator; and 8) a brush holding device that holds the brushes along with the corresponding springs. Further, in the second commutator motor, the brush holding device includes a plurality of brush holders and a substantially annular holder plate. Each of the brush holders includes a holder frame, which receives therein a corresponding pair of one of the brushes and one of the springs, and a bottom plate that has two opposite side portions. The holder plate is disposed around the commutator and has a major surface on which a plurality of pairs of guide walls are formed at given intervals in a circumferential direction of the holder plate; each pair of the guide walls defining a pair of grooves in the holder plate. The side portions of the bottom plate of each of the brush holders are respectively fit in a corresponding pair of the grooves defined by the guide walls in the holder plate. Each of the brush holders has a radially outer end that abuts a radially inner surface of the yoke, whereby radially outward movement of each of the brush holders is restricted by the yoke.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings:

FIGS. 10A and 10B are front and rear views, respectively, showing a conventional brush holding device.

Figure 1:
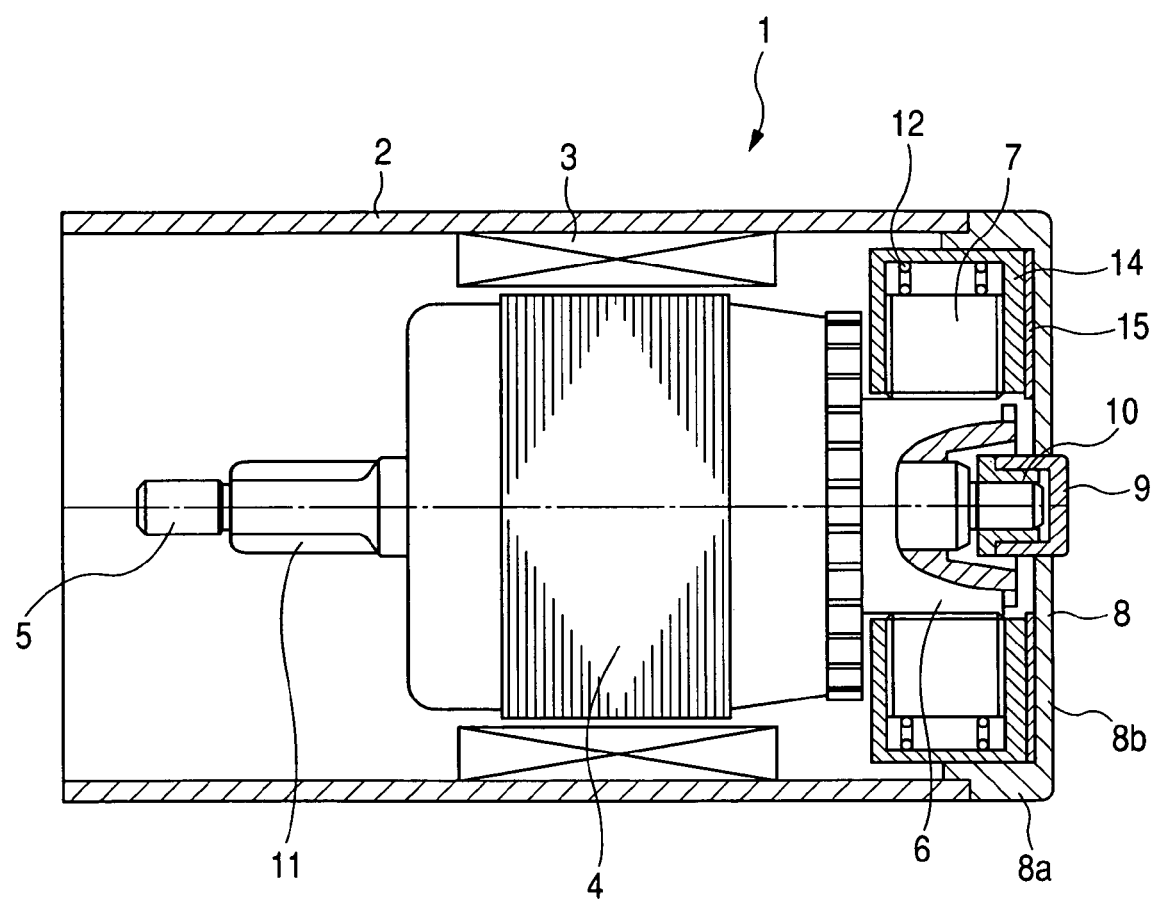
FIG. 1 is a partially cross-sectional side view showing the overall configuration of a commutator motor according to the first embodiment of the invention.

DESCRIPTION OF PREFERRED
EMBODIMENTS

Preferred embodiments of the present invention will be described hereinafter with reference to FIGS. 1-9B.

It should be noted that, for the sake of clarity and understanding, identical components having identical functions in different embodiments of the invention have been marked, where possible, with the same reference numerals in each of the figures.

First Embodiment

FIG. 1 shows the overall configuration of a commutator motor 1 according to the first embodiment of the invention. The commutator motor 1 is designed for use in, for example, an engine starter of a motor vehicle.

As shown in FIG. 1, the commutator motor 1 includes: a hollow cylindrical yoke 2 for forming a magnetic circuit; a field 3 (implemented by either permanent magnets or field windings) that is arranged on the inner periphery of the yoke 2; an armature 4 that is rotatably disposed within the field 3 with a predetermined gap between itself and the field 3 and includes an armature shaft 5 for outputting torque; a commutator 6 that is provided on a rear end portion of the armature shaft 5; a plurality of brushes 7 that make sliding contacts with the outer surface of the commutator 6 to supply electric current to the armature 4 via the commutator 6; and an end frame 8 that closes a rear open end of the yoke 2.

The rear end portion of the armature shaft 5, on which the commutator 6 is provided, is rotatably supported by a boss portion 9 formed in the end frame 8 via a bearing 10. The armature shaft 5 also includes a front end portion on which is provided a gear 11 for torque transmission. It should be noted that the boss portion 9 can be made either integrally with or separately from the end frame 8.

The brushes 7 consist of, for example, four brushes that are arranged around the outer surface of the commutator 6 and held by a brush holding device 13.

Figure 6:
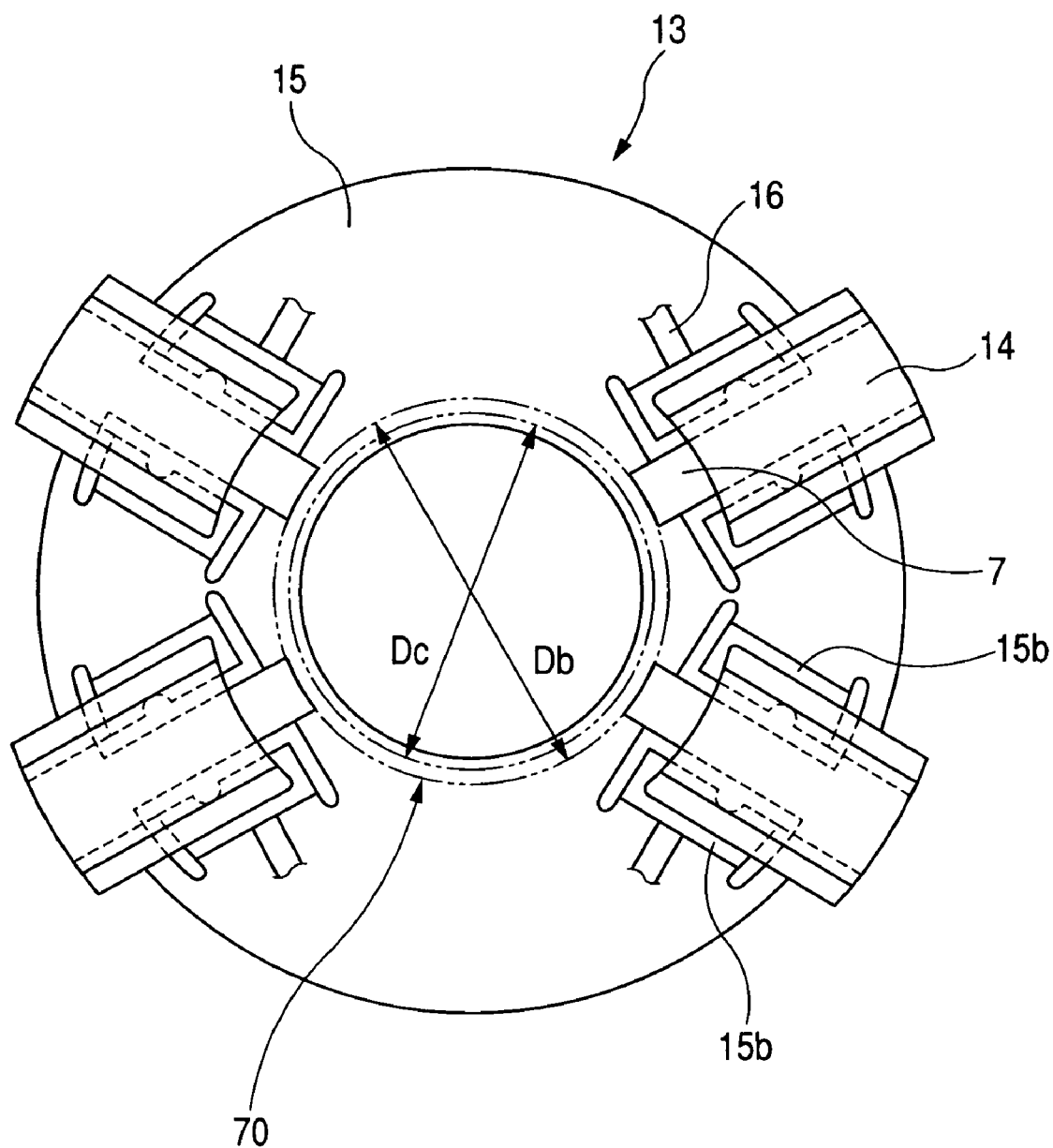
FIG. 6 is a plan view showing the holder plate with a plurality of brush holders temporarily fixed thereto.

The brush holding device 13 includes, as shown in FIG. 6, four brush holders 14 and a substantially annular holder plate 15 on a major surface of which the brush holders 14 are mounted. Each of the brushes 7 is held in a corresponding one of the brush holders 14 and pressed against the outer surface of the commutator 6 by a spring coil 12 received in the corresponding brush holder 14.

Figure 2A:
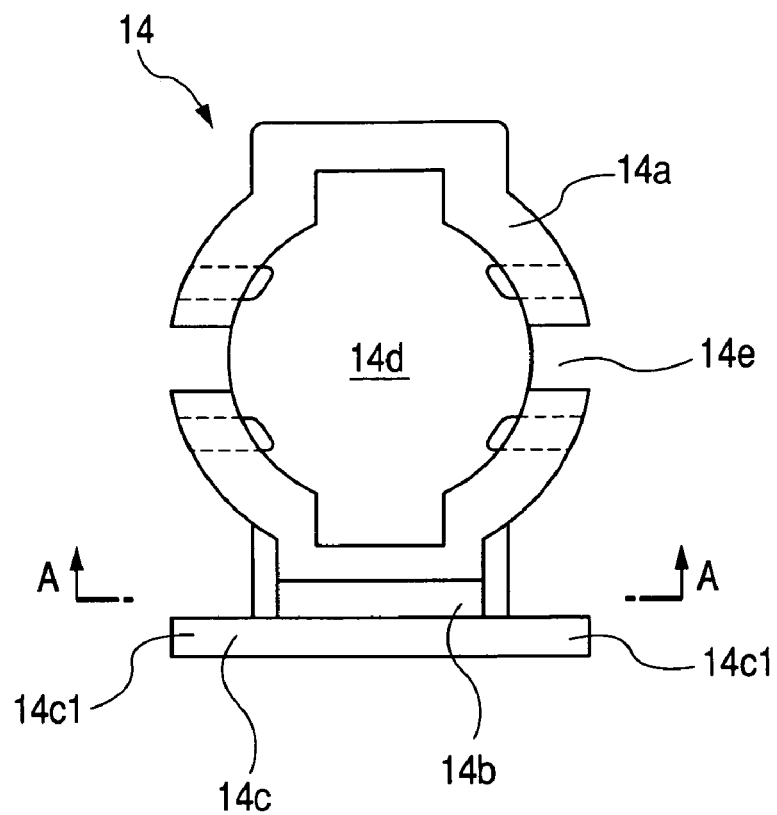
FIG. 2A is a front view showing a brush holder of a brush holding device included in the commutator motor.
Figure 2B:
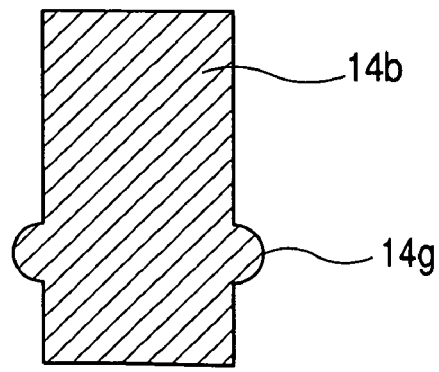
FIG. 2B is a cross-sectional view taken along the line A-A in FIG. 2A.
Figure 3:
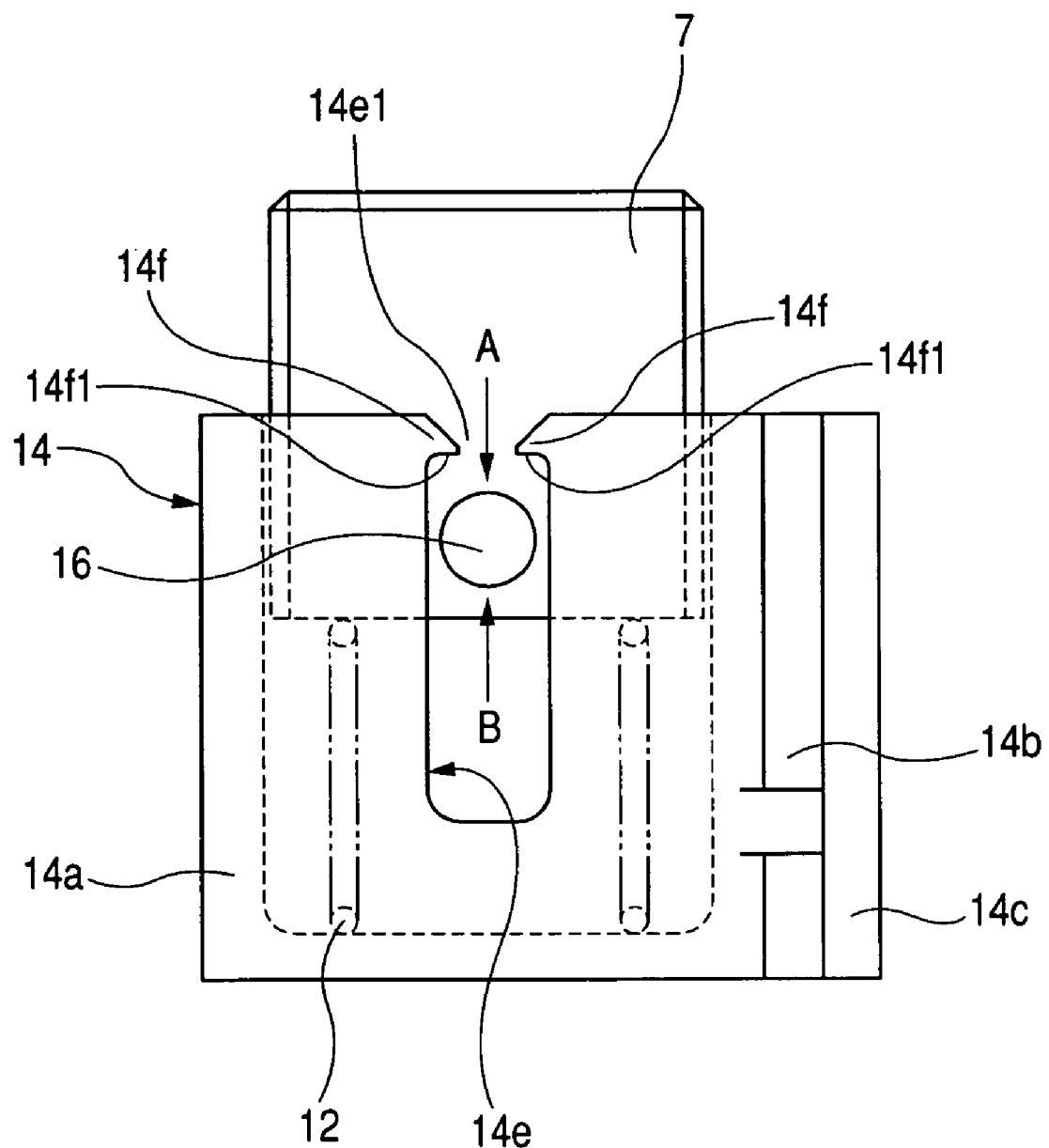
FIG. 3 is a side view showing the brush holder with both a brush and a spring received therein.

Referring to FIGS. 2A, 2B and 3, each of the brush holders 14 includes a holder frame 14a that receives therein a pair of brush 7 and coil spring 12, a seat portion 14b, and a bottom plate 14c. All of the holder frame 14a, the seat portion 14b, and the bottom plate 14c are integrally formed.

The holder frame 14a has formed therein a chamber 14d for receiving the pair of brush 7 and coil spring 12. The holder frame 14a has an open end, through which the pair of brush 7 and coil spring 12 is placed into the chamber 14d, and a closed end that is opposite to the open end and closed by an end wall.

The holder frame 14a further has an opposite pair of side walls through each of which an elongated-opening 14e is formed. It should be noted that in the present embodiment, though there are provided two elongated-openings 14e, only one of them is used to lead a pigtail 16, which is fixed to a side surface of the brush 7, out of the chamber 14d. In addition, both the elongated-openings 14e have the same configuration in the present embodiment; therefore, only one of the elongated-openings 14e will be described hereinafter.

Referring to FIG. 3, the elongated-opening 14e has an entrance 14e1 which is formed at the open end of the holder frame 14a and through which the pigtail 16 is inserted into the elongated-opening 14e. The holder frame 14a further has means for keeping the pigtail 16 from getting out of the elongated-opening 14e.

More specifically, in the present embodiment, the holder frame 14a has two fishhook-like portions 14f that each point to the open end of the holder frame 14a and together define the entrance 14e1 to the elongated-opening 14e. Further, the minimum width of the entrance 14e1, which is represented by the distance between the barbs 14f1 of the fishhook-like portions 14f, is set to be smaller than the diameter of the pigtail 16.

With the above configuration, the pigtail 16 can be easily inserted into the elongated-opening 14e through the entrance 14e1 in the direction A of FIG. 3, but cannot get out of the elongated-opening 14e through the entrance 14e1 in the B direction of FIG. 3. In other words, the fishhook-like portions 14f together make up the means for keeping the pigtail 16 from getting out of the elongated-opening 14e.

Referring back to FIGS. 2A and 2B, the seat portion 14b, which is positioned between the holder frame 14a and the bottom plate 14c, has a rectangular shape with its longitudinal direction coincident with the longitudinal direction of the holder frame 14a. The seat portion 14b has two protrusions 14g that respectively protrude from both the longer side surfaces of the seat portion 14b.

The bottom plate 14c has the same length as the seat portion 14b. However, the width of the bottom plate 14c is greater than that of the seat portion 14b, so that an opposite pair of side portions 14c1 of the bottom plate 14c respectively protrude, in the widthwise direction, from the pair of longer side surfaces of the seat portion 14b.

Figure 4A:
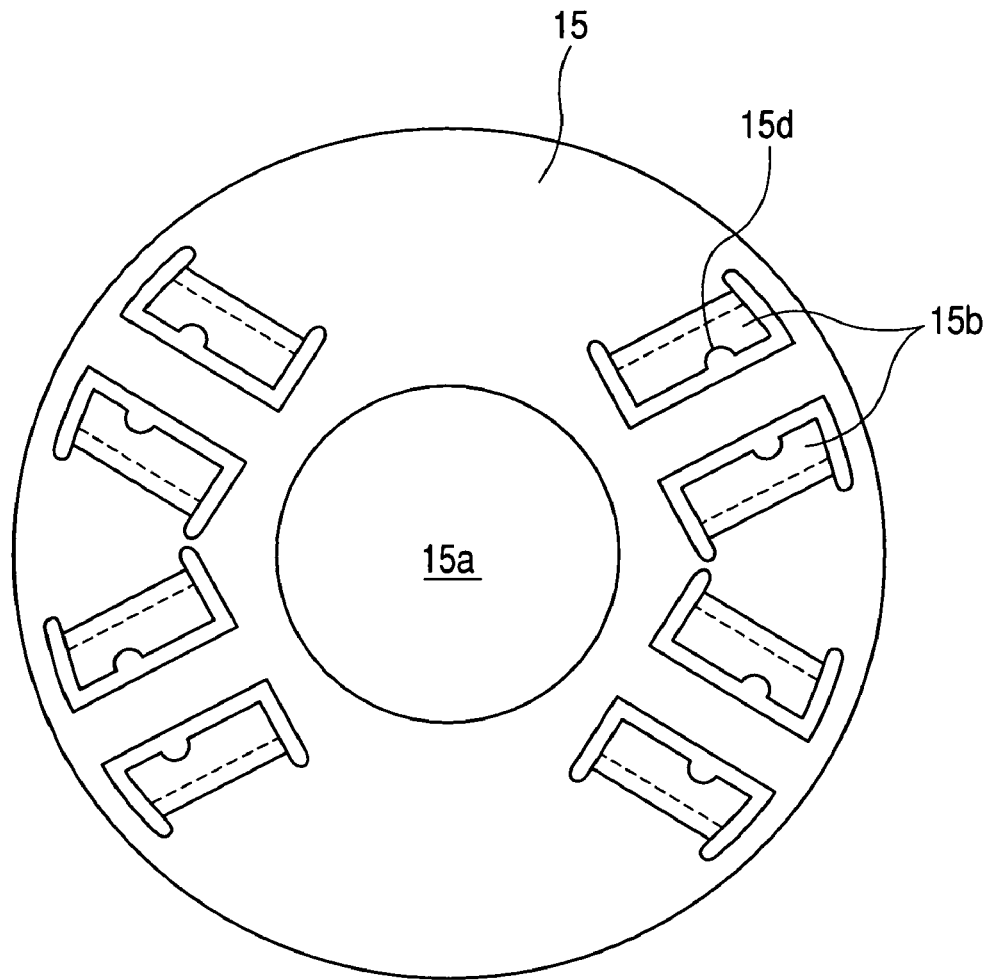
FIG. 4A is a plan view showing a holder plate of the brush holding device.

On the other hand, the holder plate 15 of the brush holding device 13 has, as shown in FIG. 4A, a circular hole 15a that is formed in a radially center portion of the holder plate 15. The holder plate 15 also has four fixing portions that are spaced in the circumferential direction of the holder plate 15 to respectively fix the four brush holders 14.

Figure 4B:
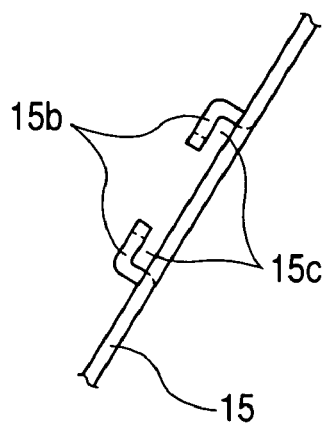
FIG. 4B is a front view showing a pair of guide walls formed in the holder plate.

Each of the fixing portions is, as shown in FIG. 4B, made up of a pair of guide walls 15b. Each of the guide walls 15b is cut and raised up from a major surface of the holder plate 15 and bent into a hook shape (or an "L" shape). The pair of guide walls 15b are spaced in the circumferential direction of the holder plate 15 by a predetermined distance, and bent in opposite directions to face each other. Each of the guide walls 15b defines, together with the major surface of the holder plate 15, a groove 15c. Moreover, the circumferential distance between the pair of the guide walls 15b is so predetermined that the bottom plate 14c of a corresponding one of the brush holders 14 can be fit in the grooves 15c defined by the guide walls 15b. Furthermore, each of the guide walls 15b has a recess 15d that is formed in an upper, inner side surface of the guide wall 15b to engage with one of the protrusions 14g of the seat portion 14b of the corresponding brush holder 14.

Turning back to FIG. 1, in the present embodiment, the end frame 8 is substantially cup-shaped to have a cylindrical side wall 8a and an end wall 8b. The side wall 8a is stepped in shape, so that it can be partially inserted in the yoke 2, thereby allowing the end wall 8b to cover the rear open end of the yoke 2. In other words, the side wall 8a engages with the rear open end of the yoke 2, and the end wall 8b covers the rear open end in the axial direction of the yoke 2.

After having described the overall configuration of the commutator motor 1, an assembly process of the brush holding device 13 according to the present embodiment will be described hereinafter.

First, each of the brush holders 14 is assembled, with the pair of brush 7 and coil spring 12 inserted in its chamber 14d, to the holder plate 15.

Figure 5:
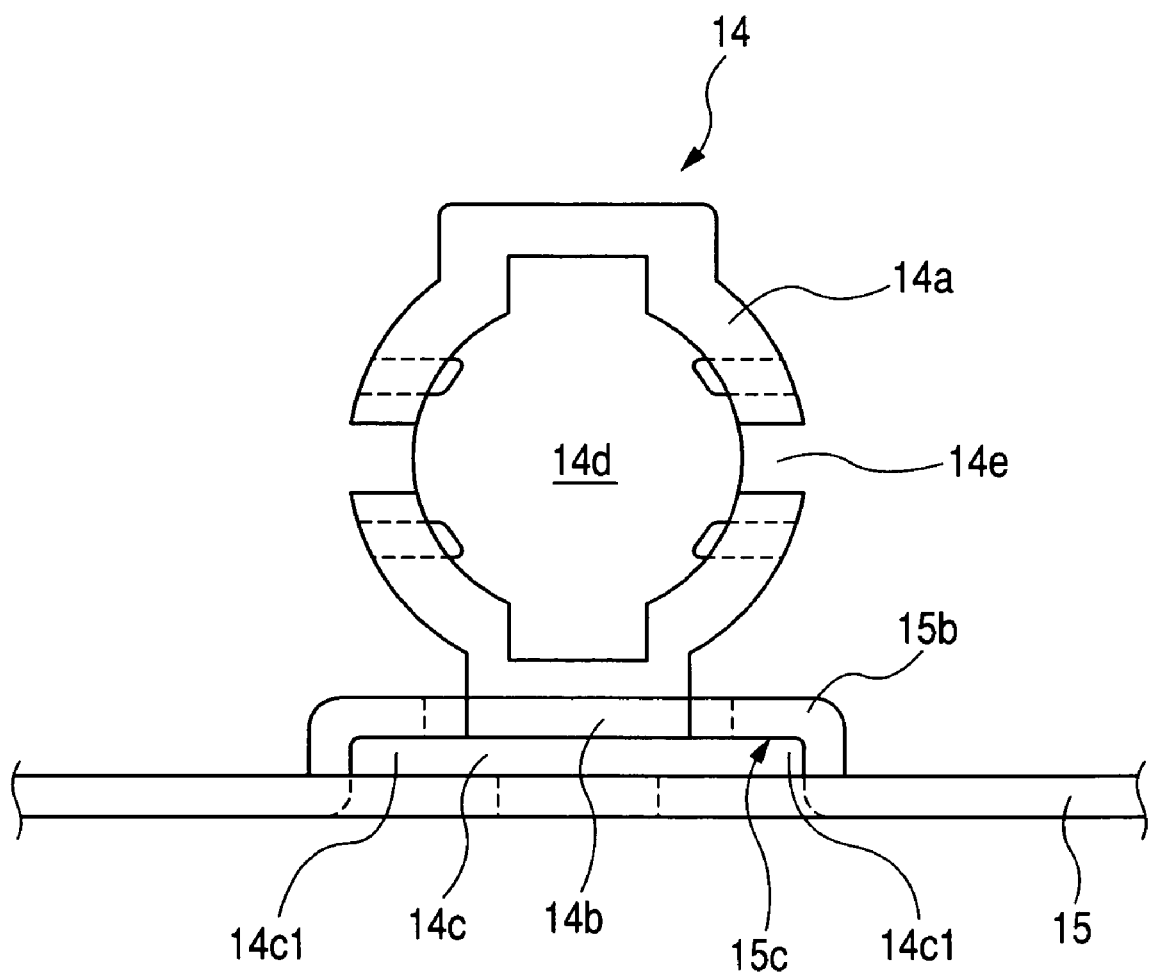
FIG. 5 is a front view showing the brush holder and the holder plate that are assembled together.

More specifically, each of the brush holders 14 is moved either from the radially outer side or the radially inner side of the holder plate 15 toward the corresponding pair of guide walls 15b, with the bottom plate 14c sliding on the major surface of the holder plate 15, thereby inserting both the side portions 14c1 of the bottom plate 14c into the pair of grooves 15c defined by the corresponding guide walls 15b. Consequently, as shown in FIG. 5, each of the brush holders 14 is temporarily fixed at a given position, with the undersurface of the bottom plate 14c abutting the major surface of the holder plate 15 and the side portions 14c1 of the bottom plate 14c respectively fit in the pair of grooves 15c.

The temporary fixing of each of the brush holders 14 on the holder plate 15 is accomplished by the engagements between the protrusions 14g formed in the seat portion 14b of the brush holder 14 and the recesses 15d formed in the corresponding pair of guide walls 15b of the holder plate 15. In other words, each of the brush holders 14 is fixed at the given position where the protrusions 14g respectively engage with the recesses 15d.

Moreover, when each of the brush holders 14 is fixed at the given position, as shown in FIG. 6, there is satisfied the following dimensional relationship:

$$Db > Dc \quad (1),$$

where Db is the diameter of a hypothetical circle 70 that is tangent to all of the radially inner ends of the four brushes 7, and Dc is the outer diameter of the commutator 6.

In addition, the brush 7 inserted in the chamber 14d of each of the brush holders 14 is pressed by the corresponding coil spring 12 in the direction to get out of the chamber 14d (i.e., the radially inward direction). However, since the pigtail 16 fixed to the brush 7 is kept by the fishhook-like portions 14f of the holder frame 14a from getting out of the elongated-opening 14e, the brush 7 is accordingly kept from getting out of the chamber 14d to break the dimensional relationship (1).

Secondly, the brush holding device 13 is disposed around the outer surface of the commutator 6. Then, each of the brush holders 14 is pushed radially inward, breaking the engagements between the protrusions 14g of the brush holder 14 and the corresponding recesses 15d of the holder plate 15, thereby bringing the radially inner end of the brush 7 received in the brush holder 14 into contact with the outer surface of the commutator 6. Thereafter, each of the brush holders 14 is further pushed radially inward, compressing the coil spring 12 received in the brush holder 14, along the corresponding pair of grooves 15c by a given distance. As a result, the radially outer end of each of the brush holders 14 is located on or inner than the outer diameter of the holder plate 15.

Finally, the brush holding device 13 is assembled to the end frame 8, as shown in FIG. 1. Then, each of the brush holders 14 is moved radially outward by the force of the coil spring 12 received therein, so that the radially outer end of each of the brush holders 14 is brought into contact with the inner surface of the side wall 8a of the end frame 8. Consequently, the radially outward movement of each of the brush holders 14 is restricted by the end frame 8.

The above-described commutator motor 1 according to the present embodiment has the following advantages.

In the present embodiment, each of the brush holders 14 is assembled to the holder plate 15 by sliding the bottom plate 14c of the brush holder 14 on the major surface of the holder plate 15 and inserting the side portions 14c1 of the bottom plate 14c into the corresponding pair of grooves 15c defined in the holder plate 15. Further, to prevent the bottom plate 14c from getting out of the corresponding pair of grooves 15c in the radially outward direction due to the force of the coil spring 12, the radially outer end of each of the brush holders 14 is made to abut the inner surface of the side wall 8a of the end frame 8.

Consequently, the radially outward movement of each of the brush holders 14 is restricted by the end frame 8, without forming such a movement restricting portion as disclosed in Japanese Patent No. 3486094. As a result, the number of processes needed to produce the brush holding device 13 is reduced.

Moreover, since the radially outer end of each of the brush holders 14 abuts the inner surface of the side wall 8a of the end frame 8 without any clearance therebetween, the radial dimension of the commutator motor 1 can be minimized.

In the present embodiment, the brush holding device 13 has temporary fixing means for temporarily fixing each of the brush holders 14, which has the corresponding pair of brush 7 and coil spring 12 received therein, at the given position on the major surface of the holder plate 15 in assembling the brush holders 14 to the holder plate 15.

More specifically, the temporary fixing means is made up of the protrusions 14g formed in the seat portions 14b of the brush holders 14 and the recesses 15d formed in the guide walls 15b of the holder plate 15.

Further, at the given positions of the brush holders 14, the diameter Db of the hypothetical circle 70 tangent to all of the radially inner ends of the brushes 7 is greater than the outer diameter Dc of the commutator 6.

With the above temporary fixing means, the brush holding device 13 can be easily disposed around the outer surface of the commutator 6, without any interference between the radially inner ends of the brushes 7 and the outer surface of the commutator 6.

In the present embodiment, the holder frame 14a of each of the brush holders 14 has the open end through which the corresponding pair of brush 7 and coil spring 12 is placed into the chamber 14d formed in the holder frame 14a. The holder frame 14a also has the elongated-opening 14e through which the pigtail 16 fixed to the corresponding brush 7 is led out of the chamber 14d. The elongated-opening 14e has the entrance 14e1 which is formed at the open end of the holder frame 14a and through which the pigtail 16 is inserted into the elongated-opening 14e. The holder frame 14a further has keeping means for keeping the pigtail 16 from getting out of the elongated-opening 14e.

With the keeping means, in assembling the brush holders 14 to the holder plate 15, the pigtail 16 in the elongated-opening 14e of the holder frame 14a of each of the brush holders 14 is kept from getting out of the elongated-opening 14e, thereby keeping the corresponding brush 7 from getting out of the holder frame 14a to break the dimensional relationship of Db>Dc.

Moreover, in the present embodiment, the keeping means is made up of the two fishhook-like portions 14f of the holder frame 14a which each point to the open end of the holder frame 14a and together define the entrance 14e1 to the elongated-opening 14e. Further, the distance between the barbs 14f1 of the fishhook-like portions 14f, which represents the minimum width of the entrance 14e1, is smaller than the diameter of the pigtail 16.

With the above configuration, the pigtail 16 can be easily inserted into the elongated-opening 14e through the entrance 14e1, but cannot get out of the elongated-opening 14e through the entrance 14e1.

In addition, in the present embodiment, the commutator motor 1 is designed for use in an engine starter of a motor vehicle.

With the use of the commutator motor 1, the size of the engine starter can be minimized, thereby saving the space in the engine compartment of the motor vehicle.

Second Embodiment

Figure 7A:
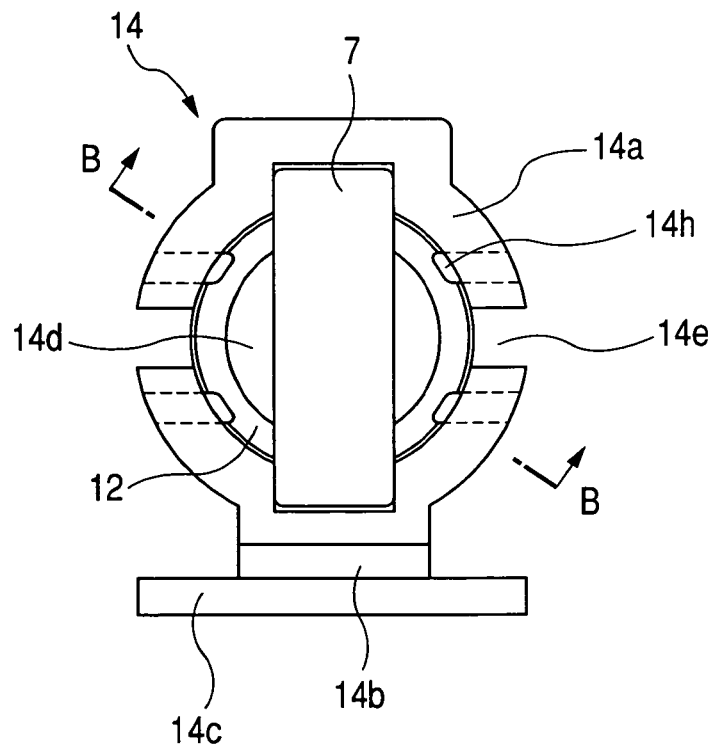
FIG. 7A is a front view showing a brush holder according to the second embodiment of the invention, with both a brush and a spring received therein.
Figure 7B:
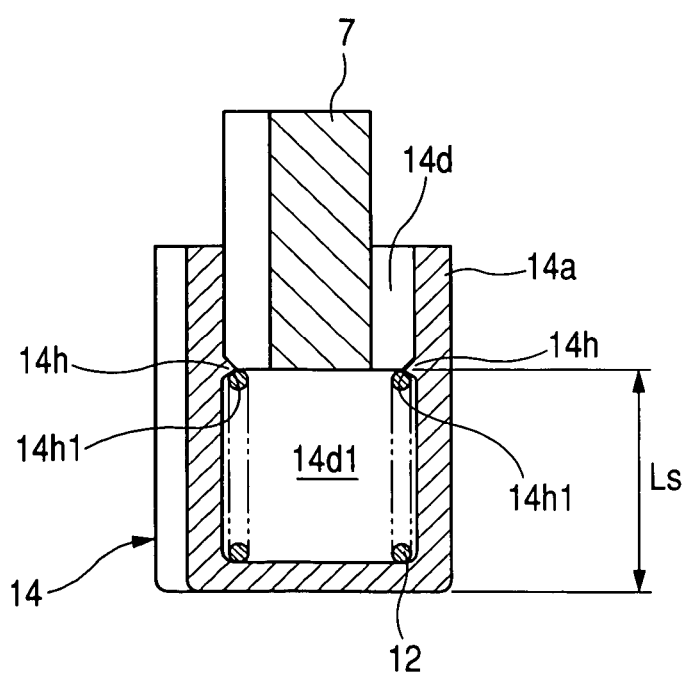
FIG. 7B is a cross-sectional view taken along the line B-B in FIG. 7A.

FIGS. 7A and 7B show the configuration of the brush holders 14 according to the second embodiment of the invention.

In the present embodiment, the holder frame 14a of each of the brush holders 14 has restricting means for restricting the length of the corresponding coil spring 12 received in the chamber 14d formed in the holder frame 14a.

More specifically, the restricting means is made up of four protrusions 14h that protrude from the inner surface of the holder frame 14a without interfering with the corresponding brush 7 received in the chamber 14d. Further, the restricting means restricts the length of the corresponding coil spring 12 to a value Ls, at which in assembling the brush holders 14 to the holder plate 15, the corresponding brush 7 subject to the force of the corresponding coil spring 12 can be kept from getting out of the holder frame 14a to break the dimensional relationship of Db>Dc. Moreover, the value Ls is set to be longer than a value which the length of the corresponding coil spring 12 has when the service life of the corresponding brush 7 expires.

Furthermore, in the present embodiment, each of the four protrusions 14h is fishhook-shaped to point to the open end of the holder frame 14a, with the maximum distance between the barbs 14h1 of the protrusions 14h smaller than the diameter of the corresponding coil spring 12.

With the above configuration, the corresponding coil spring 12 can be easily inserted into an inside portion 14d1 of the chamber 14d over the protrusions 14h, but cannot get out of the inside portion 14d1 over the protrusions 14h.

Third Embodiment

Figure 8:
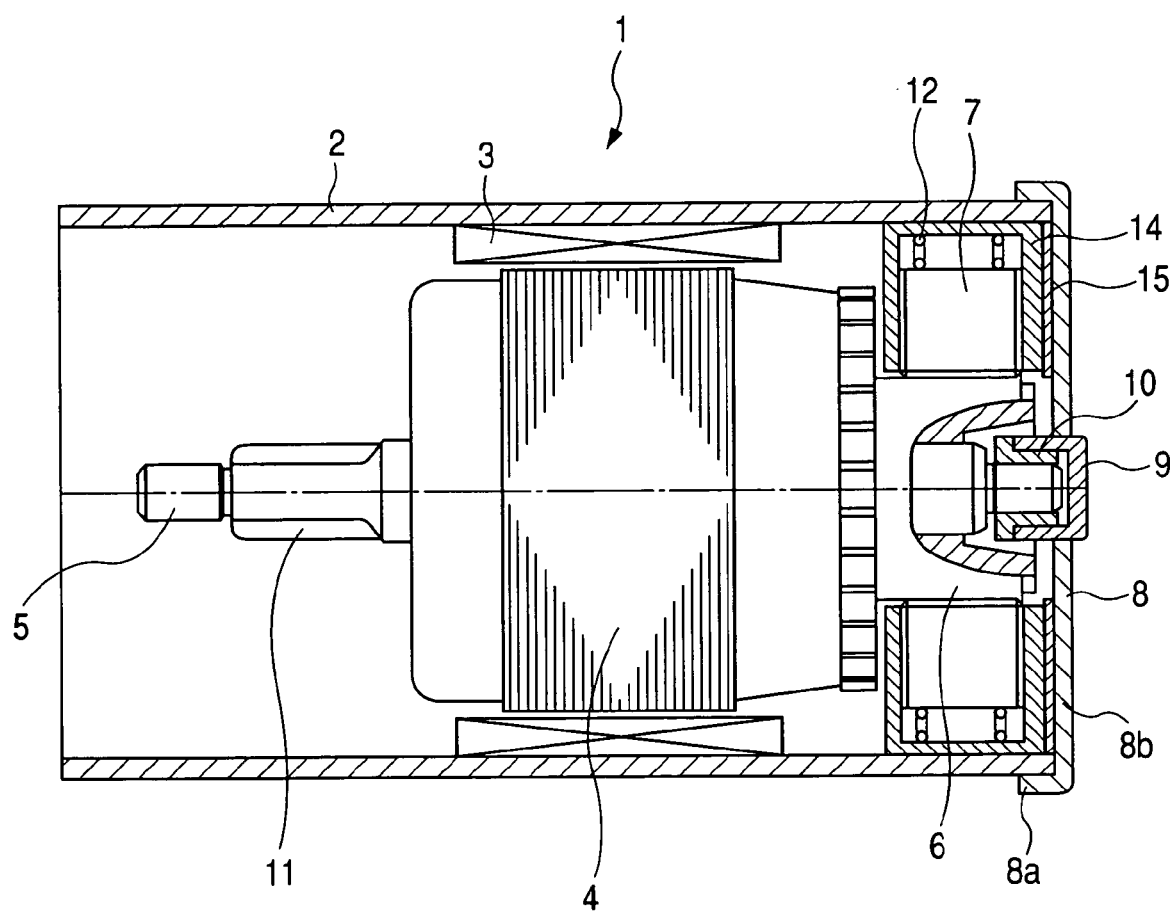
FIG. 8 is a partially cross-sectional side view showing the overall configuration of a commutator motor according to the third embodiment of the invention.

FIG. 8 shows the overall configuration of the commutator motor 1 according to the third embodiment of the invention.

In the present embodiment, the side wall 8a of the end frame 8 is not inserted in the yoke 2; instead, it surrounds the outer surface of the yoke 2.

Accordingly, in the present embodiment, the radially outward movement of each of the brush holders 14 is restricted by the yoke 2, instead of the side wall 8a of the end frame 8.

More specifically, in the present embodiment, after disposing the brush holding device 13 around the commutator 6, each of the brush holders 14 is pushed radially inward, breaking the engagements between the protrusions 14g of the brush holder 14 and the corresponding recesses 15d of the holder plate 15, thereby bringing the radially inner end of the brush 7 received in the brush holder 14 into contact with the outer surface of the commutator 6. Then, each of the brush holders 14 is further pushed radially inward, compressing the coil spring 12 received in the brush holder 14, along the corresponding pair of grooves 15c by a given distance. Consequently, the radially outer end of each of the brush holders 14 is located on or inside the outer diameter of the holder plate 15. Thereafter, the brush holding device 13 is assembled into the yoke 2, as shown in FIG. 8. Then, each of the brush holders 14 is moved radially outward by the force of the coil spring 12 received therein, so that the radially outer end of each of the brush holders 14 is brought into contact with the inner surface of the yoke 2. As a result, the radially outward movement of each of the brush holders 14 is restricted by the yoke 2.

The commutator motor 1 according to the present embodiment has the same advantages as that according to the first embodiment.

Fourth Embodiment

Figure 9A:
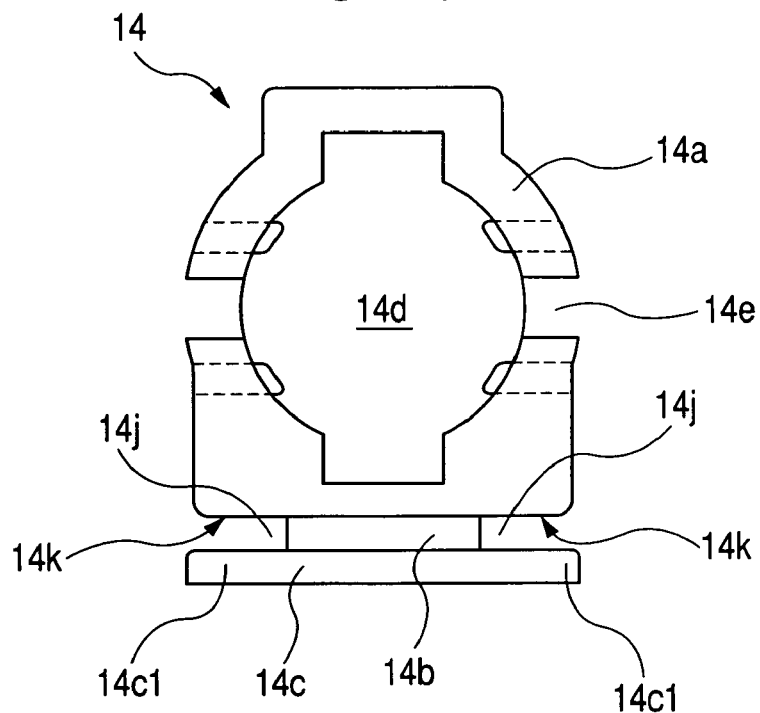
FIG. 9A is a front view showing a brush holder according to the fourth embodiment of the invention.

FIG. 9A shows the configuration of the brush holders 14 according to the fourth embodiment of the invention, which is almost identical to the configuration of the brush holders 14 according to the first embodiment. Accordingly, only the difference therebetween will be described hereinafter.

In the present embodiment, each of the brush holders 14 has a pair of grooves 14j that are formed between the holder frame 14a and the bottom plate 14c and on both the lateral sides of the seat portion 14b, respectively. More specifically, the holder frame 14a is so formed as to have two flat surfaces 14k that are parallel to the side portions 14c1 of the bottom plate 14c. Each of the grooves 14j is formed between a corresponding pair of one of the flat surfaces 14k of the holder flame 14a and one of the side portions 14c1 of the bottom plate 14c.

Figure 9B:
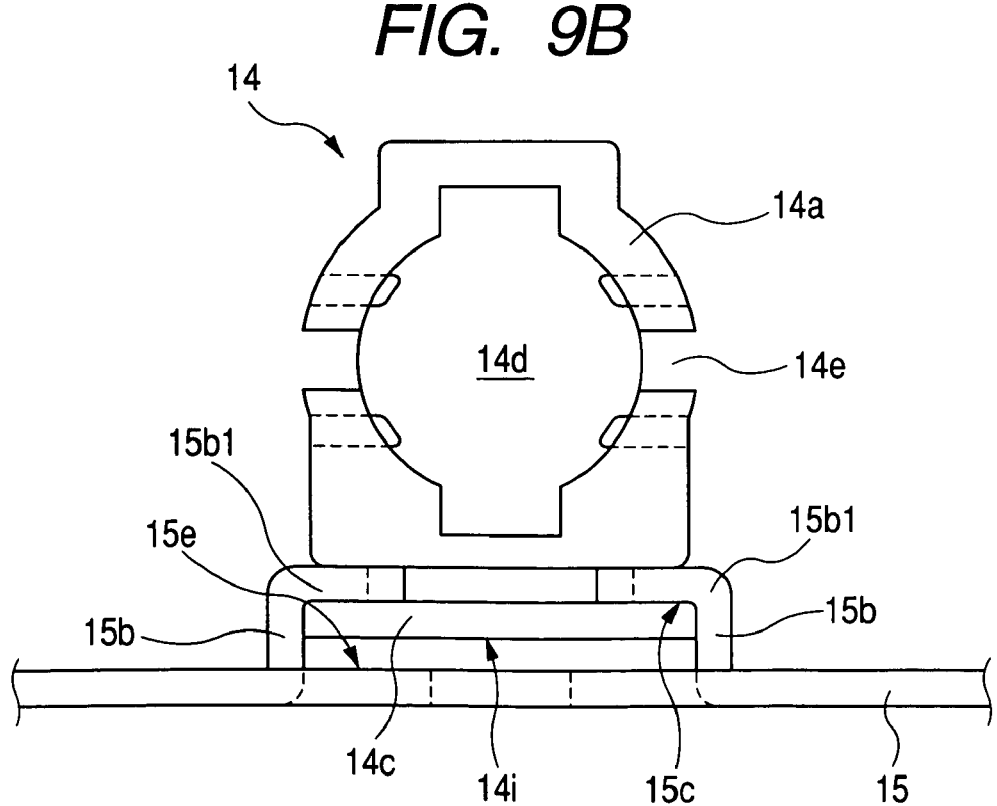
FIG. 9B is a front view showing the brush holder of FIG. 9A with a holder plate assembled thereto.

Referring now to FIG. 9B, in assembling the brush holders 14 to the holder plate 15, each of the brush holders 14 is moved either from the radially outer side or the radially inner side of the holder plate 15 toward the corresponding pair of guide walls 15b, without the undersurface 14i of the bottom plate 14c touching the major surface 15e of the holder plate 15, thereby inserting upper portions 15b1 of the corresponding guide walls 15b respectively into the grooves 14j formed in the brush holder 14.

With the above configuration of the brush holders 14 according to the present embodiment, it is also possible to achieve the advantages of the commutator motor 1 described in the first embodiment.

While the above particular embodiments of the invention have been shown and described, it will be understood by those skilled in the art that various modifications, changes, and improvements may be made without departing from the spirit of the invention.

For example, in the first embodiment, the holder frame 14a of each of the brush holders 14 has means for keeping the pigtail 16 from getting out of the elongated-opening 14e; by keeping the pigtail 16 from getting out of the elongated-opening 14e, the corresponding brush 7 is kept from getting out of the holder frame 14a to break the dimensional relationship of Db>Dc. On the other hand, in the second embodiment, the holder frame 14a of each of the brush holders 14 has means for restricting the length of the corresponding coil spring 12 received in the holder frame 14a; by restricting the length of the corresponding coil spring 12, the corresponding brush 7 is kept from getting out of the holder frame 14a to break the dimensional relationship of Db>Dc.

However, the holder frame 14a of each of the brush holders 14 may also be configured to have both the means for keeping the pigtail 16 from getting out of the elongated-opening 14e and the means for restricting the length of the corresponding coil spring 12. With this configuration, it is possible to more reliably keep the corresponding brush 7 from getting out of the holder frame 14a to break the dimensional relationship of Db>Dc.

What is claimed is:

1. A commutator motor comprising:
a hollow cylindrical yoke having an open end;
an end frame that closes the open end of the yoke, the end frame having a cylindrical side wall that engages with the open end of the yoke and an end wall that covers the open end of the yoke;
a field arranged on an inner periphery of the yoke;
an armature surrounded by the field to generate torque, the armature including an armature shaft that has an end portion rotatably supported by the end frame via a bearing;
a commutator that is provided on the end portion of the armature shaft;
a plurality of brushes that slide on the outer surface of the commutator during rotation of the armature shaft;
a plurality of springs each of which presses a corresponding one of the brushes against the outer surface of the commutator; and
a brush holding device that holds the brushes along with the corresponding springs,
wherein the brush holding device includes a plurality of brush holders and a substantially annular holder plate,
each of the brush holders includes a holder frame, which receives therein a corresponding pair of one of the brushes and one of the springs, and a bottom plate that has two opposite side portions,
the holder plate is disposed around the commutator and has a major surface on which a plurality of pairs of guide walls are formed at given intervals in a circumferential direction of the holder plate, each pair of the guide walls defining a pair of grooves in the holder plate,
the side portions of the bottom plate of each of the brush holders are respectively fit in a corresponding pair of the grooves defined by the guide walls in the holder plate,
each of the brush holders has a radially outer end that abuts an inner surface of the side wall of the end frame, whereby radially outward movement of each of the brush holders is restricted by the end frame,
the brush holding device further has temporary fixing means for temporarily fixing each of the brush holders, which has the corresponding pair of brush and spring received therein, at a given position on the major surface of the holder plate in assembling the brush holders to the holder plate, and
for each of the brush holders, the radially outer end of the brush holder abuts the inner surface of the side wall of the end frame with the temporary fixing means disabled and with the brush holder radially moved from the given position.

2. The commutator motor as set forth in claim 1, wherein at the given positions of the brush holders, there is satisfied the following dimensional relationship:

$$Db > Dc,$$

where Db is the diameter of a hypothetical circle that is tangent to all of radially inner ends of the brushes, and Dc is the outer diameter of the commutator.

3. The commutator motor as set forth in claim 2, wherein each of the guide walls of the holder plate has a recess formed therein,
each of the brush holders further includes a seat portion between the holder frame and the bottom plate, the seat portion having a pair of protrusions formed therein to respectively engage with the recesses formed in a corresponding pair of the guide walls, and the temporary fixing means is made up of the protrusions formed in the seat portions of the brush holders and the recesses formed in the guide walls of the holder plate.

4. The commutator motor as set forth in claim 2, wherein the holder frame of each of the brush holders has:
an open end through which the corresponding pair of brush and spring is placed into the holder frame;
an elongated-opening that is formed through a side wall of the holder frame to lead a pigtail fixed to the corresponding brush out of the holder frame, the elongated-opening having an entrance which is formed at the open end of the holder frame and through which the pigtail is inserted into the elongated-opening; and
keeping means for keeping the pigtail from getting out of the elongated-opening, and
wherein in assembling the brush holders to the holder plate, the pigtail in the elongated-opening of the holder frame of each of the brush holders is kept by the keeping means from getting out of the elongated-opening, thereby keeping the corresponding brush from getting out of the holder frame to break the dimensional relationship of Db>Dc.

5. The commutator motor as set forth in claim 4, wherein the holder frame of each of the brush holders has two fishhook-like portions that each point to the open end of the holder frame and together define the entrance to the elongated-opening of the holder frame,
the distance between barbs of the two fishhook-like portions, which represents the minimum width of the entrance, is smaller than the diameter of the pigtail, and
the keeping means is made up of the two fishhook-like portions.

6. The commutator motor as set forth in claim 2, wherein the holder frame of each of the brush holders has:
an open end through which the corresponding pair of brush and spring is placed into the holder frame; and
restricting means for restricting the length of the corresponding spring in the holder frame, and
wherein in assembling the brush holders to the holder plate, the length of the corresponding spring is restricted by the restricting means, thereby keeping the corresponding brush, which is subject to the force of the corresponding spring, from getting out of the holder frame to break the dimensional relationship of Db>Dc.

7. The commutator motor as set forth in claim 6, wherein the restricting means is made up of a plurality of protrusions that protrude from an inner surface of the holder frame without interfering with the corresponding brush, and
each of the protrusions is fishhook-shaped to point to the open end of the holder frame, with the maximum distance between barbs of the protrusions smaller than the diameter of the corresponding spring.

8. The commutator motor as set forth in claim 1, wherein the commutator motor is designed for use in an engine starter of a motor vehicle.

9. A commutator motor comprising:
a hollow cylindrical yoke having an open end;
an end frame that closes the open end of the yoke;
a field arranged on an inner periphery of the yoke;
an armature surrounded by the field to generate torque, the armature including an armature shaft that has an end portion rotatably supported by the end frame via a bearing;
a commutator that is provided on the end portion of the armature shaft;
a plurality of brushes that slide on the outer surface of the commutator during rotation of the armature shaft;
a plurality of springs each of which presses a corresponding one of the brushes against the outer surface of the commutator; and
a brush holding device that holds the brushes along with the corresponding springs,
wherein the brush holding device includes a plurality of brush holders and a substantially annular holder plate,
each of the brush holders includes a holder frame, which receives therein a corresponding pair of one of the brushes and one of the springs, and a bottom plate that has two opposite side portions,
the holder plate is disposed around the commutator and has a major surface on which a plurality of pairs of guide walls are formed at given intervals in a circumferential direction of the holder plate, each pair of guide walls defining a pair of grooves in the holder plate,
the side portions of the bottom plate of each of the brush holders are respectively fit in a corresponding pair of the grooves defined by the guide walls in the holder plate, and
each of the brush holders has a radially outer end that abuts a radially inner surface of the yoke, whereby radially outward movement of each of the brush holders is restricted by the yoke,
the brush holding device further has temporary fixing means for temporarily fixing each of the brush holders, which has the corresponding pair of brush and spring received therein, at a given position on the major surface of the holder plate in assembling the brush holders to the holder plate, and
for each of the brush holders, the radially outer end of the brush holder abuts the radially inner surface of the yoke with the temporary fixing means disabled and with the brush holder radially moved from the given position.

10. The commutator motor as set forth in claim 9,
wherein at the given positions of the brush holders, there is satisfied the following dimensional relationship:

Db>Dc, where Db is the diameter of a hypothetical circle that is tangent to all of radially inner ends of the brushes, and Dc is the outer diameter of the commutator.

11. The commutator motor as set forth in claim 10, wherein each of the guide walls of the holder plate has a recess formed therein,
each of the brush holders further includes a seat portion between the holder frame and the bottom plate, the seat portion having a pair of protrusions formed therein to respectively engage with the recesses formed in a corresponding pair of the guide walls, and the temporary fixing means is made up of the protrusions formed in the seat portions of the brush holders and the recesses formed in the guide walls of the holder plate.

12. The commutator motor as set forth in claim 10, wherein the holder frame of each of the brush holders has:
an open end through which the corresponding pair of brush and spring is placed into the holder frame;
an elongated-opening that is formed through a side wall of the holder frame to lead a pigtail fixed to the corresponding brush out of the holder frame, the elongated-opening having an entrance which is formed at the open end of the holder frame and through which the pigtail is inserted into the elongated-opening; and
keeping means for keeping the pigtail from getting out of the elongated-opening, and
wherein in assembling the brush holders to the holder plate, the pigtail in the elongated-opening of the holder frame of each of the brush holders is kept by the keeping means from getting out of the elongated-opening, thereby keeping the corresponding brush from getting out of the holder frame to break the dimensional relationship of Db>Dc.

13. The commutator motor as set forth in claim 12, wherein the holder frame of each of the brush holders has two fishhook-like portions that each point to the open end of the holder frame and together define the entrance to the elongated-opening of the holder frame,
the distance between barbs of the two fishhook-like portions, which represents the minimum width of the entrance, is smaller than the diameter of the pigtail, and
the keeping means is made up of the two fishhook-like portions.

14. The commutator motor as set forth in claim 10, wherein the holder frame of each of the brush holders has:
- an open end through which the corresponding pair of brush and spring is placed into the holder frame; and
- restricting means for restricting the length of the corresponding spring in the holder frame, and
- wherein in assembling the brush holders to the holder plate, the length of the corresponding spring is restricted by the restricting means, thereby keeping the corresponding brush, which is subject to the force of the corresponding spring, from getting out of the holder frame to break the dimensional relationship of Db>Dc.

15. The commutator motor as set forth in claim 14, wherein the restricting means is made up of a plurality of protrusions that protrude from an inner surface of the holder frame without interfering with the corresponding brush, and
- each of the protrusions is fishhook-shaped to point to the open end of the holder frame, with the maximum distance between barbs of the protrusions smaller than the diameter of the corresponding spring.

16. The commutator motor as set forth in claim 9, wherein the commutator motor is designed for use in an engine starter of a motor vehicle.

* * * * *

UNITED STATES PATENT AND TRADEMARK OFFICE
CERTIFICATE OF CORRECTION

| | | |
|---|---|---|
| PATENT NO. | : 8,304,954 B2 | Page 1 of 1 |
| APPLICATION NO. | : 12/232044 | |
| DATED | : November 6, 2012 | |
| INVENTOR(S) | : Kurasawa | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 746 days.

Signed and Sealed this
Thirtieth Day of September, 2014

Michelle K. Lee
*Deputy Director of the United States Patent and Trademark Office*